(12) United States Patent
Singer et al.

(10) Patent No.: US 10,460,387 B2
(45) Date of Patent: Oct. 29, 2019

(54) DYNAMIC INFORMATION CONFIGURATION AND DISPLAY

(71) Applicant: Trading Technologies International, Inc., Chicago, IL (US)

(72) Inventors: Scott F. Singer, Green Oaks, IL (US); Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 14/133,187

(22) Filed: Dec. 18, 2013

(65) Prior Publication Data

US 2015/0170274 A1 Jun. 18, 2015

(51) Int. Cl.
*G06Q 40/04* (2012.01)
*G06F 3/01* (2006.01)

(52) U.S. Cl.
CPC .............. *G06Q 40/04* (2013.01); *G06F 3/013* (2013.01)

(58) Field of Classification Search
CPC ........ G06Q 40/04; G06Q 40/00; G06Q 40/06; G06Q 30/08; G06Q 40/025
USPC .......................................................... 705/37
See application file for complete search history.

(56) References Cited

U.S. PATENT DOCUMENTS

| | | | |
|---|---|---|---|
| 4,644,472 A | 2/1987 | Montgomery | |
| 5,220,361 A | 6/1993 | Lehmer et al. | |
| 5,339,392 A | 8/1994 | Risberg et al. | |
| 5,347,452 A | 9/1994 | Bay, Jr. | |
| 5,471,542 A | 11/1995 | Ragland | |
| 5,596,699 A | 1/1997 | Driskell | |
| 5,689,651 A | 11/1997 | Lozman | |
| 5,797,002 A | 8/1998 | Patterson, Jr. et al. | |
| 5,831,954 A | 11/1998 | Tognazzini et al. | |
| 5,937,388 A | 8/1999 | Davis et al. | |
| 6,106,119 A | 8/2000 | Edwards | |
| 6,134,535 A | 10/2000 | Belzberg | |
| 6,272,474 B1 | 8/2001 | Garcia | |
| 6,577,329 B1 | 6/2003 | Flickner et al. | |
| 6,608,615 B1 | 8/2003 | Martins | |
| 6,766,304 B2 | 7/2004 | Kemp, II et al. | |
| 6,772,132 B1 | 8/2004 | Kemp, II et al. | |
| 6,792,617 B2 | 9/2004 | Gorbatov et al. | |

(Continued)

OTHER PUBLICATIONS

VerticalNews, Title: Sony Interactive Entertainment Inc.; Patent Issued for Video Analysis Device, Video Analysis Method, and Point-of-Gaze Display System, Aug. 21, 2017:2973, Journal of Engineering—Atlanta (Aug. 21, 2017)—First p. 2973. Publisher: NewsRx LLC (Year: 2017).*

(Continued)

*Primary Examiner* — Benjamin S Brindley
(74) *Attorney, Agent, or Firm* — McDonnell Boehnen Hulbert & Berghoff LLP

(57) ABSTRACT

A system, method, and non-transitory computer-readable information recording medium displays information to a user. Market data related to a plurality of tradeable objects is received from an exchange at a trading device. The display of market data related to each tradeable object is separately controlled. If the user is not paying attention to the market data of a particular tradeable object, then the dissemination of the market data for that tradeable object may be temporarily stopped until the user starts paying attention to that tradeable object.

10 Claims, 6 Drawing Sheets

(56) References Cited

U.S. PATENT DOCUMENTS

| | | |
|---|---|---|
| 6,801,201 B2 | 10/2004 | Escher |
| 6,883,143 B2 | 4/2005 | Driskell |
| 6,910,024 B2 | 6/2005 | Krishnamurthy et al. |
| 6,934,735 B1 | 8/2005 | Emens et al. |
| 6,981,052 B1 | 12/2005 | Cheriton |
| 6,988,132 B2 | 1/2006 | Horvitz |
| 7,000,181 B2 | 2/2006 | Press |
| 7,002,570 B2 | 2/2006 | Perry et al. |
| 7,110,974 B1 | 9/2006 | Rust |
| 7,113,190 B2 | 9/2006 | Heaton |
| 7,124,110 B1 | 10/2006 | Kemp, II et al. |
| 7,127,424 B2 | 10/2006 | Kemp, II et al. |
| 7,138,575 B2 | 11/2006 | Childs, Jr. et al. |
| 7,139,938 B2 | 11/2006 | Marwaha |
| 7,143,186 B2 | 11/2006 | Stewart et al. |
| 7,155,477 B2 | 12/2006 | Blair et al. |
| 7,177,833 B1 | 2/2007 | Marynowski et al. |
| 7,184,966 B1 | 2/2007 | Parsonnet et al. |
| 7,202,793 B2 | 4/2007 | Grace et al. |
| 7,239,612 B1 | 7/2007 | Cole et al. |
| 7,260,543 B1 | 8/2007 | Saulpaugh et al. |
| 7,308,428 B1 | 12/2007 | Federspiel et al. |
| 7,356,501 B2 | 4/2008 | Churquina |
| 7,389,268 B1 | 6/2008 | Kemp, II et al. |
| 7,391,887 B2 | 6/2008 | Durnell |
| 7,394,968 B2 | 7/2008 | Watkins |
| 7,401,334 B2 | 7/2008 | Fussell |
| 7,434,225 B2 | 10/2008 | Groetzner et al. |
| 7,447,645 B2 | 11/2008 | Spragle et al. |
| 7,469,283 B2 | 12/2008 | Eyal et al. |
| 7,493,407 B2 | 2/2009 | Leedom et al. |
| 7,552,077 B1 | 6/2009 | Schluetter et al. |
| 7,562,041 B2 | 7/2009 | Chehade et al. |
| 7,590,587 B2 | 9/2009 | Duquette |
| 7,680,721 B2 | 3/2010 | Cutler |
| 7,685,049 B1 | 3/2010 | Singer |
| 7,698,187 B2 | 4/2010 | Huizing et al. |
| 7,701,456 B1 | 4/2010 | Buck |
| 7,702,806 B2 | 4/2010 | Gil et al. |
| 7,739,182 B2 | 6/2010 | Myr |
| 7,743,340 B2 | 6/2010 | Horvitz et al. |
| 7,747,486 B1 | 6/2010 | Smith |
| 7,747,513 B2 | 6/2010 | Duquette et al. |
| 7,758,811 B2 | 7/2010 | Durack et al. |
| 7,761,362 B2 | 7/2010 | Triplett |
| 7,783,558 B1* | 8/2010 | Schwarz ............. G06Q 40/04 705/37 |
| 7,818,232 B1 | 10/2010 | Mead et al. |
| 7,844,726 B2 | 11/2010 | Foygel et al. |
| 7,844,776 B2 | 11/2010 | Chen |
| 7,877,312 B2 | 1/2011 | Thompson et al. |
| 7,913,183 B2 | 3/2011 | Czerwinski et al. |
| 7,941,357 B2 | 5/2011 | McGeorge |
| 7,945,508 B2 | 5/2011 | Duquette et al. |
| 7,962,398 B1 | 6/2011 | Swearingen et al. |
| 8,108,299 B1 | 1/2012 | Waelbroeck et al. |
| 8,117,102 B1 | 2/2012 | Buck |
| 8,131,868 B2 | 3/2012 | Foygel et al. |
| 8,232,962 B2 | 7/2012 | Buck |
| 8,290,850 B1 | 10/2012 | Singer |
| 8,433,645 B1* | 4/2013 | Waelbroeck .......... G06Q 40/04 705/37 |
| 8,547,330 B2 | 10/2013 | Buck |
| 8,560,429 B2 | 10/2013 | Buck |
| 8,854,302 B2 | 10/2014 | Buck |
| 8,868,776 B2 | 10/2014 | Foygel et al. |
| 9,351,133 B2 | 5/2016 | Offen et al. |
| 9,450,404 B2 | 9/2016 | Chung |
| 9,639,896 B2 | 5/2017 | Foygel et al. |
| 9,772,685 B2* | 9/2017 | Buck .................... G06F 3/013 |
| 2001/0056391 A1 | 12/2001 | Schultz |
| 2002/0023038 A1 | 2/2002 | Fritsch et al. |
| 2002/0026404 A1 | 2/2002 | Thompson |
| 2002/0039111 A1 | 4/2002 | Gips et al. |
| 2002/0052821 A1 | 5/2002 | Terashima |
| 2002/0055899 A1 | 5/2002 | Williams |
| 2002/0069079 A1 | 6/2002 | Vega |
| 2002/0130858 A1 | 9/2002 | Perry et al. |
| 2002/0130868 A1 | 9/2002 | Smith |
| 2002/0161685 A1 | 10/2002 | Dwinnell |
| 2002/0174199 A1 | 11/2002 | Horvitz |
| 2003/0009411 A1 | 1/2003 | Ram et al. |
| 2003/0038754 A1 | 2/2003 | Goldstein et al. |
| 2003/0177085 A1 | 9/2003 | Buckwalter et al. |
| 2003/0236737 A1 | 12/2003 | Kemp, II et al. |
| 2004/0055447 A1 | 3/2004 | Childs, Jr. et al. |
| 2004/0056900 A1* | 3/2004 | Blume .................. G06F 3/0481 715/807 |
| 2004/0066414 A1 | 4/2004 | Czerwinski et al. |
| 2004/0070509 A1 | 4/2004 | Grace et al. |
| 2004/0098462 A1 | 5/2004 | Horvitz et al. |
| 2004/0100467 A1 | 5/2004 | Heaton |
| 2004/0210504 A1 | 10/2004 | Rutman |
| 2005/0060256 A1 | 3/2005 | Peterson et al. |
| 2005/0144113 A1 | 6/2005 | Opperman et al. |
| 2005/0192887 A1 | 9/2005 | Triplett |
| 2006/0037038 A1 | 2/2006 | Buck |
| 2006/0080215 A1 | 4/2006 | Warsaw et al. |
| 2006/0195508 A1 | 8/2006 | Bernardin et al. |
| 2006/0259384 A1 | 11/2006 | Schluetter et al. |
| 2006/0265651 A1* | 11/2006 | Buck ..................... G06F 3/013 715/700 |
| 2006/0294228 A1 | 12/2006 | Almstrom |
| 2007/0100735 A1 | 5/2007 | Kemp, II et al. |
| 2007/0198397 A1 | 8/2007 | McGinley et al. |
| 2008/0097887 A1 | 4/2008 | Duquette et al. |
| 2008/0162324 A1* | 7/2008 | West .................... G06Q 40/04 705/37 |
| 2010/0023645 A1 | 1/2010 | Foygel et al. |
| 2010/0228833 A1 | 9/2010 | Duquette et al. |
| 2010/0235273 A1 | 9/2010 | Friesen et al. |
| 2010/0293110 A1 | 11/2010 | Rosenthal et al. |
| 2010/0318673 A1 | 12/2010 | Kemp, II et al. |
| 2011/0040890 A1 | 2/2011 | Foygel et al. |
| 2011/0087511 A1 | 4/2011 | Ram et al. |
| 2011/0106684 A1 | 5/2011 | Fuller et al. |
| 2011/0184849 A1* | 7/2011 | Duquette .............. G06Q 30/06 705/37 |
| 2012/0062729 A1* | 3/2012 | Hart .................... G06F 1/1626 348/135 |
| 2012/0109813 A1 | 5/2012 | Buck |
| 2012/0131221 A1 | 5/2012 | Foygel et al. |
| 2012/0203687 A1 | 8/2012 | Schwarz et al. |
| 2012/0233059 A1 | 9/2012 | Buck |
| 2013/0160073 A1 | 6/2013 | You |
| 2013/0185421 A1 | 7/2013 | Yang |
| 2013/0294336 A1 | 11/2013 | Morken et al. |
| 2013/0339214 A1 | 12/2013 | Buck |
| 2014/0019325 A1 | 1/2014 | Buck |
| 2014/0188682 A1 | 7/2014 | Singer et al. |
| 2014/0280621 A1 | 9/2014 | Bourdaillet et al. |
| 2015/0006356 A1 | 1/2015 | Foygel et al. |
| 2015/0012403 A1 | 1/2015 | Buck |
| 2015/0036569 A1 | 2/2015 | Vannithamby et al. |
| 2015/0046514 A1 | 2/2015 | Madan et al. |
| 2015/0170274 A1 | 6/2015 | Singer et al. |
| 2016/0105561 A1 | 4/2016 | Glagolev et al. |
| 2017/0180336 A1 | 6/2017 | Josephson et al. |
| 2017/0186088 A1 | 6/2017 | Foygel et al. |
| 2017/0371409 A1 | 12/2017 | Buck |
| 2018/0357573 A1 | 12/2018 | Scarborough et al. |

OTHER PUBLICATIONS

U.S. Appl. No. 13/934,785, filed Jul. 3, 2013.

"UK—Cautious Investment in Digital Investment in the City," Dealing Technology Bulletin, Jan. 1, 1991, p. 4.

Definition of the term "period of time" Webpage [online], The Free Dictionary, Princeton University and Farlex, Inc., n.d., 2 pages. [Retrieved on May 10, 2012] from the Internet: http://www.thefreedictionary.com/period+of+time.

(56) References Cited

OTHER PUBLICATIONS

Definition of the term "substantial" Webpage [online], Free Merriam-Webster Dictionary, Merriam-Webster, Inc., 2012 2 pages. [Retrieved on May 10, 2012] from the Internet: http://www.merriam-webster.com/dictionary/substantial.
Extended European Search Report in European Patent Application No. 09803429.1 dated Aug. 12, 2013, dated Aug. 26, 2013.
Gresh, D.L, et al., "An Interactive Framework for Visualizing Foreign Currency Exchange Options," Proceeding Visualization 1999, San Francisco, CA, Oct. 24, 29, 1999, Piscataway, NY: IEEE, 1999, Abstract, p. 1.
International Search Report of International Application No. PCT/US2005/021700, dated Oct. 25, 2005 (dated Dec. 29, 2005).
International Search Report and Written Opinion of International Application No. PCT/US2013/035652, dated Jul. 2, 2013 (dated Jul. 11, 2013).
International Search Report of International Application No. PCT/US2009/051820, dated Sep. 1, 2009 (dated Sep. 15, 2009).
Jereski, L. and Zweig, C., "The Mouse that Trades," Forbes, Oct. 28, 1991, p. 186 [Retrieved on Nov. 2, 2009] from Dialog at https://www.dialogclassic.com/mainframe/html (3 pages).
Macklem, K., "Only for the Stout of Heart: In the Heat of a Day-Trading Room, a Mere Touch on a Computer Keyboard as You Watch Intraday Gyrations of Stock Markets Can Earn or Cost Thousands of Dollars," Feb. 13, 1999, pp. 1-2.
Takaaki, Y., "Stock Violation Index Calculation Processing Program," Feb. 21, 2003, p. 1.

* cited by examiner

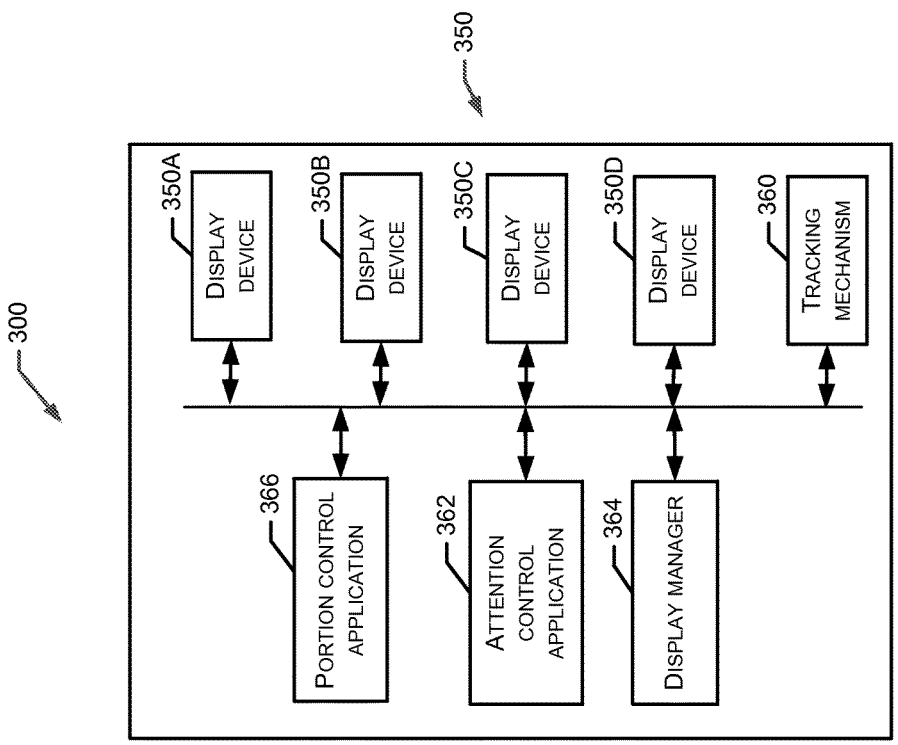

DYNAMIC INFORMATION CONFIGURATION AND DISPLAY

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

The exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals or trading device. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

To profit in electronic markets, market participants must be able to assimilate large amounts of data in order to recognize market trends and to view current market conditions. Screen space is often an important factor for a trader to consider when he/she sets up a trading workstation, since the screen space directly affects the trader's ability to quickly view and process market data. Many traders use one large monitor running at a very high resolution in an effort to get the maximum amount of data onto the screen. However, in today's information-intensive markets, to be successful, traders often need to simultaneously view multiple trading interfaces, charts, industry news, spreadsheets, as well as other information. Since each application-created interface has at least one window, a single monitor does not allow a trader to simultaneously view data on multiple windows, and the time it takes the trader to flip between the windows does not make the single monitor the most optimal trading workspace solution.

Therefore, many traders use multiple monitors to avoid flipping from one window to another, and to efficiently view all windows simultaneously. However, traders with multiple monitors can actually only look closely at one monitor at a time. Although the human peripheral field of vision is approximately 180°, the field of foveal vision (the region of the visual field where the user has the greatest visual activity) is approximately 2°. Therefore, a trader can only attend to a small part of each display at any one point in time.

The use of a large monitor or multiple monitors allows a tremendous amount of data to be displayed at any one time. Typically, such data is continuously being delivered from the exchange to the trading device. The data may be displayed directly, as soon as it is being delivered and/or received, or the data may be processed, e.g., coalesced or filtered, prior to being displayed at the trading device. Therefore, all of the data being transmitted and received at the trading device must be processed and displayed, even if the trader is not looking at the portion of the display(s) which is displaying most of the data. Furthermore, if the data is coalesced or filtered prior to displaying on the trading device, all of the data is coalesced, or otherwise filtered, and displayed, even if the trader is not looking at the portion of the display(s) which is displaying the filtered data.

The present invention is aimed at one or more of the problems identified above.

BRIEF DESCRIPTION OF THE FIGURES

Certain embodiments are disclosed with reference to the following drawings.

FIG. 3B illustrates a second block diagram of a computing or trading device according to an embodiment of the present invention.

Figure 1:
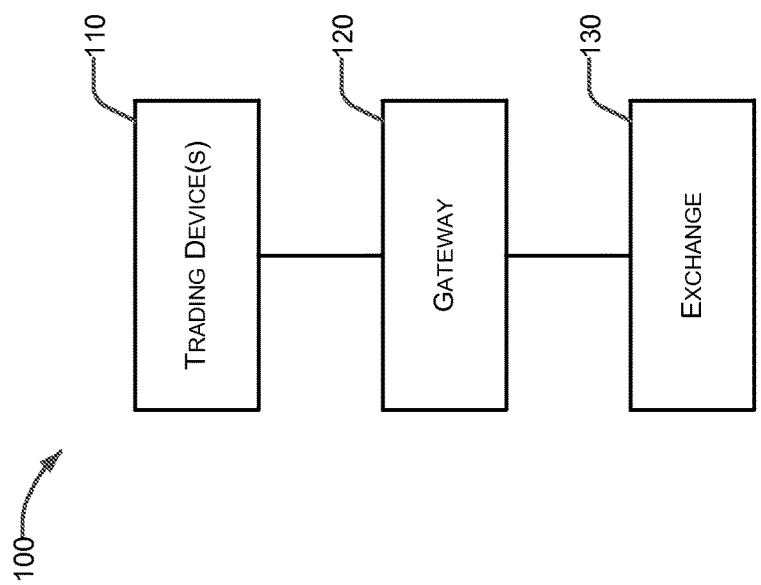
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The present invention relates generally to a computer system which is used to electronically perform trades on an exchange, and more particularly, to a system which electronically determines whether the user is not paying attention to a particular data stream and, to conserve computer resources, temporarily disables the data stream.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

In a first aspect of the present invention, a method of displaying information to a user is provided. The method includes the steps of receiving market data at a trading device, from an exchange, the market data including market data related to a first tradeable object and a second tradeable object, delivering the market data related to the first tradeable object to a first control application, and delivering the market data related to the second tradeable object to a second control application. The method also includes the steps of receiving the market data related to the first tradeable object by the first control application and responsively displaying the market data related to the first tradeable object in a first portion of a display unit and receiving the market data related to the second tradeable object by the second control application and responsively displaying the market data related to the second tradeable object in a second portion of the display unit. An attention value or metric may be used to describe both the lack of attention on the part of the user as well as the intensity or degree of attention or focus the user is paying to one of the first and second portions of the display unit. A user's attention is detected, generating an attention value, and updated market data related to a corresponding one of the first and second tradeable objects is prevented from being delivered to a corresponding one of the first and second control applications. Updated market data related to another one of the first and second tradeable objects is delivered to a corresponding another one of the first and second control application. The method further includes the step of receiving the updated market data related to the corresponding another one of the first and second tradeable objects by the corresponding another one of the first and second control applications and responsively displaying the updated market data related to the corresponding another one of the first and second tradeable objects in a corresponding another one of the first and second portions of the display unit.

In a second aspect of the present invention, a system including an exchange and a trading device is provided. The exchange provides market data to the trading device. The trading device is coupled to the exchange and is configured to:
  receive market data from the exchange, the market data including market data related to a first tradeable object and a second tradeable object;
  deliver the market data related to the first tradeable object to a first control application;
  deliver the market data related to the second tradeable object to a second control application;
  receive the market data related to the first tradeable object by the first control application and responsively display the market data related to the first tradeable object in a first portion of a display unit;
  receive the market data related to the second tradeable object by the second control application and responsively display the market data related to the second tradeable object in a second portion of the display unit;
  detect an attention value on the part of the user to one of the first and second portion of the display unit and responsively prevent updated market data related to a corresponding one of the first and second tradeable objects from being delivered to a corresponding one of the first and second control applications;
  deliver updated market data related to another one of the first and second tradeable objects to a corresponding another one of the first and second control application;
  receive the updated market data related to the corresponding another one of the first and second tradeable objects by the corresponding another one of the first and second control applications and responsively display the updated market data related to the corresponding another one of the first and second tradeable objects in a corresponding another one of the first and second portions of the display unit.

In a third aspect of the present invention, a non-transitory computer-readable information recording medium which stores a program for controlling a computer to operate the computer as a trading device coupled to an exchange, the trading device being configured to:
  receive market data from the exchange, the market data including market data related to a first tradeable object and a second tradeable object;
  deliver the market data related to the first tradeable object to a first control application;
  deliver the market data related to the second tradeable object to a second control application;
  receive the market data related to the first tradeable object by the first control application and responsively display the market data related to the first tradeable object in a first portion of the display unit;
  receive the market data related to the second tradeable object by the second control application and responsively display the market data related to the second tradeable object in a second portion of the display unit;
  detect an attention value on the part of the user to one of the first and second portion of the display unit and responsively prevent updated market data related to a corresponding one of the first and second tradeable objects from being delivered to a corresponding one of the first and second control applications;
  deliver updated market data related to another one of the first and second tradeable objects to a corresponding another one of the first and second control application;
  receive the updated market data related to the corresponding another one of the first and second tradeable objects by the corresponding another one of the first and second control applications and responsively display the updated market data related to the corresponding another one of the first and second tradeable objects in a corresponding another one of the first and second portions of the display unit.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implied pricing, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
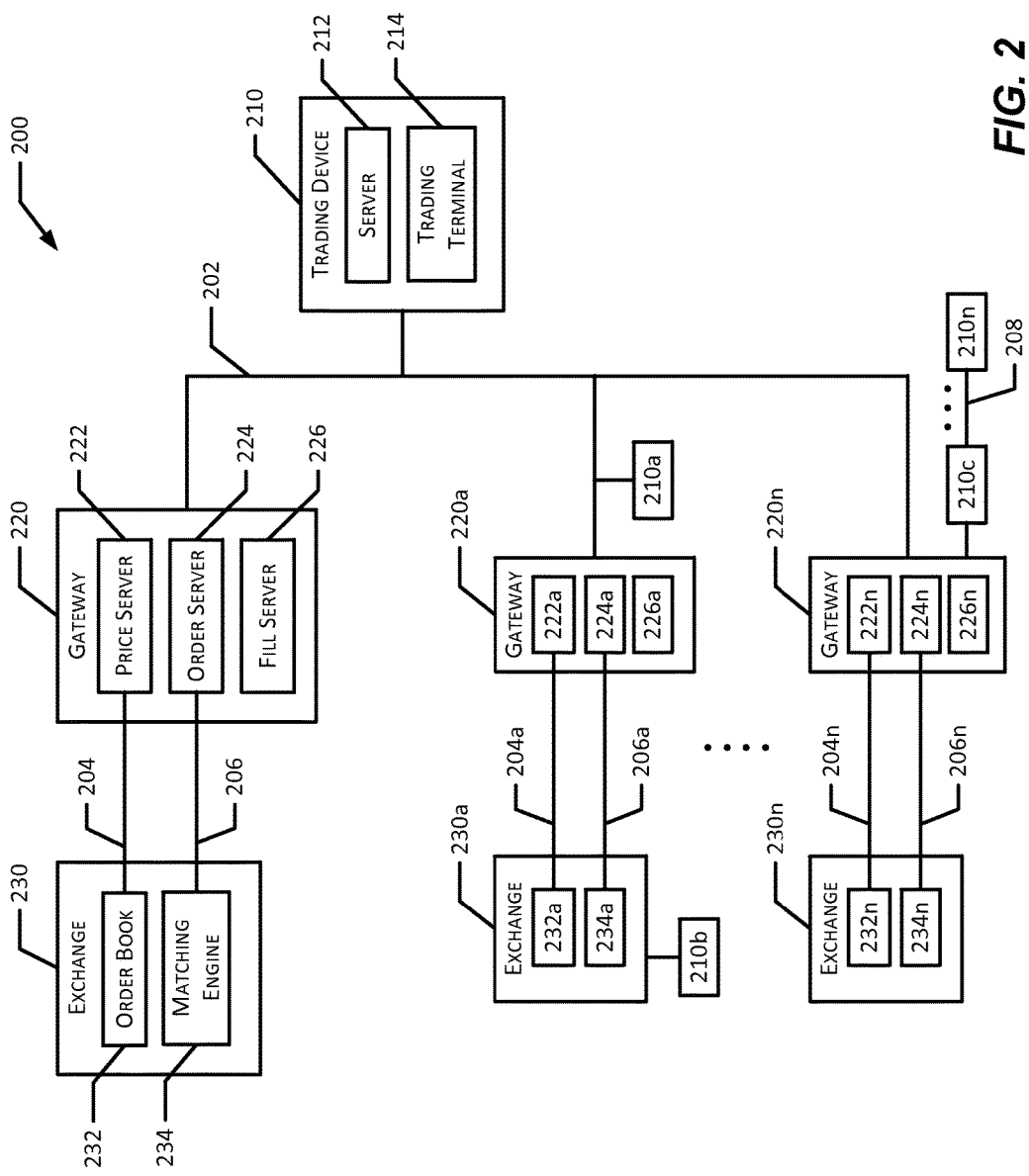
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3A:
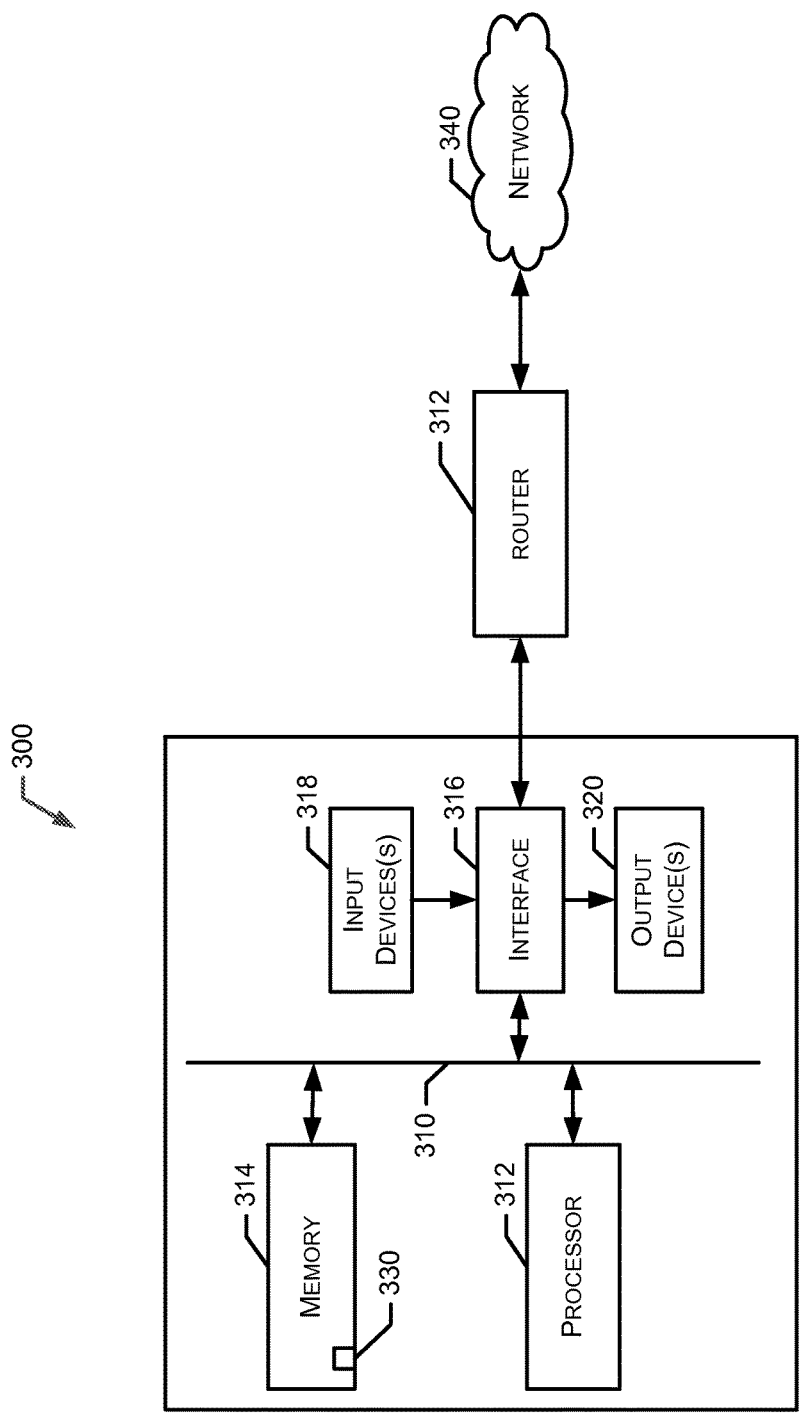
FIG. 3A illustrates a block diagram of an example computing device which may be used to implement the disclosed embodiments.

FIG. 3A illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3A, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Dynamic Information Configuration and Display

With particular reference to FIG. 3B, the output device 320 of the trading device 300 may include a display unit 350 for displaying the market data received from the exchange 130. The market data is deemed to include other information or data than the market data received directly from the exchange 130. For example, the market data may also include data generated by the trading device 300 (as a function of the market data received from the exchange 130 or otherwise), other information (received from other sources), and a user interface, which allows the trader to prepare and communicate trade orders to the exchange 130.

In one embodiment, the display unit 350 is a single display device. In another embodiment, the display unit 350 includes a plurality of display devices. In the illustrated embodiment, the display unit 350 includes first, second, third and fourth display devices 350A, 350B, 350C, 350D, although the present invention is not limited to any number of display devices. In one aspect of the present invention, the display devices 350A, 350B, 350C, 350D are treated as a single large display, where elements (such as windows) displayed thereon are freely moveable across the separate display devices. In other aspect of the present invention, the display devices 350A, 350B, 350C, 350D are treated as a single large display, however, the position of elements or blocks of information are predetermined and generally fixed (although the position may be configurable).

In one aspect of the present invention, the user's focus on a portion of the display unit 350. i.e., the portion of the display unit at which the trader is currently looking, is detected and used to define a user focus area on the display unit. In one embodiment, the user's focus is detected using a tracking mechanism 360. In general, the tracking mechanism 360 may include one or more sensors which are configured to detect the trader's posture, the direction the trader is facing, and/or an area of the display unit at which the trader is currently looking. In the illustrated embodiment, the tracking mechanism 360 may be controlled by and/or the sensor information may be used by an attention control application 362 which runs on the trading device 110.

In aspect of the present invention, the tracking mechanism 360 includes at least one of a facial recognition system, an acoustic position system, a distance sensor, an imaging sensor and other suitable sensor(s). There are many currently existing technologies providing gaze detection and tracking functionality, and the tracking mechanism 360 can include any existing or later developed gaze detection and tracking systems. According to one embodiment, the tracking mechanism 360 may capture the user's gaze, and then provide the user's gaze position data to an attention control application 362.

Upon receiving the user's gaze position data, the attention control application 362 may first determine the user's gaze position coordinates in relation to one of the monitors or a specific area of portion thereof (see below). When the attention control application 362 detects a user shifting his eyes away from one of the monitors or a portion of a display on one of the monitors (see below), the attention control application 362 may provide a signal to a display manager 364 which controls display of information on the display unit 350. Additional embodiments and systems directed to managing data displays based on a user's attention data are disclosed and discussed in commonly owned U.S. Pat. No. 8,232,962, entitled "System and Method for Display Management based on User Attention Inputs", which is incorporated herein by reference.

Figure 4:
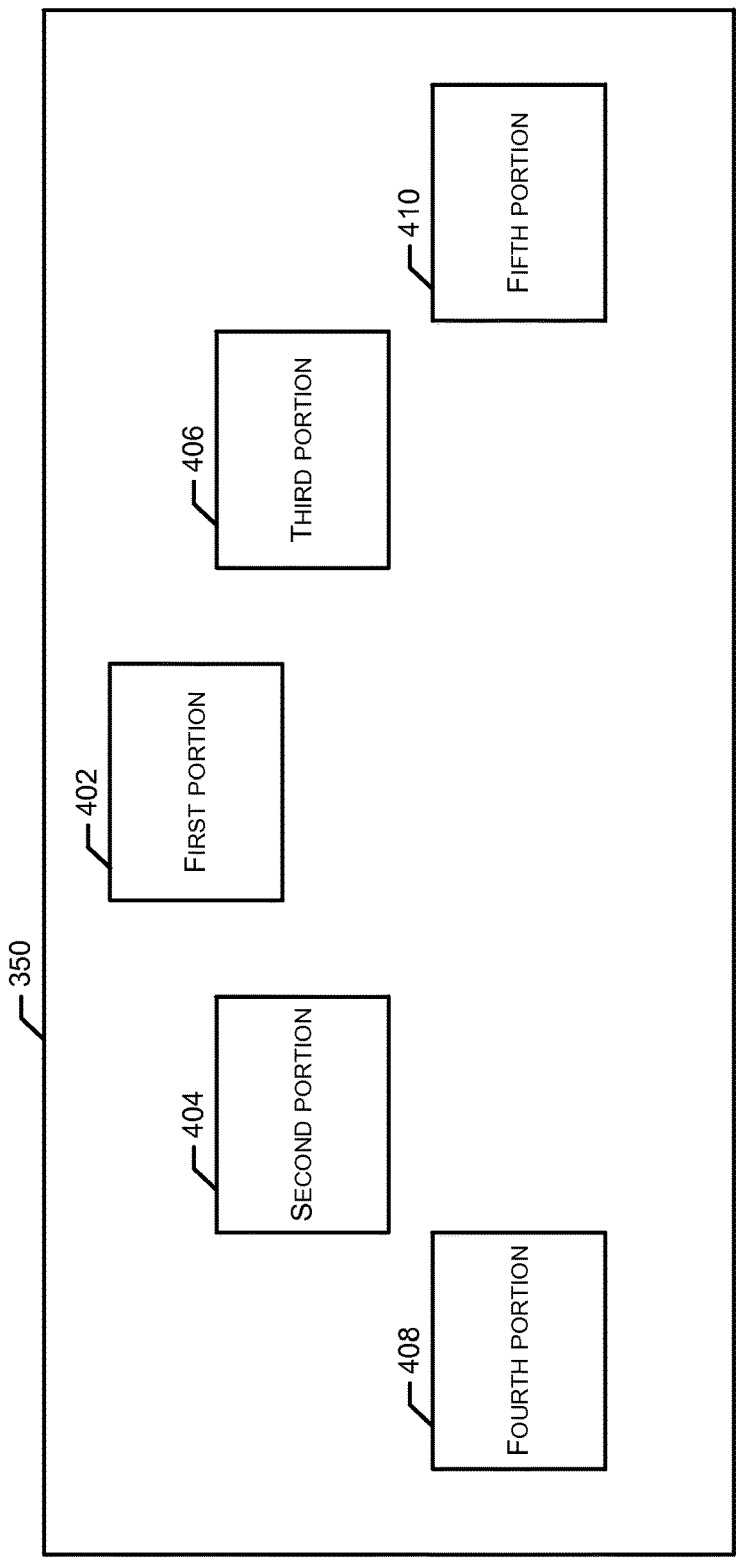
FIG. 4 illustrates a display unit having a plurality of display portions or areas for displaying market data related to a plurality of tradeable objects, according to an embodiment of the present invention.

With particular reference to FIG. 4, the market data may be displayed in defined windows 402, 404, 406, 408, 410 on the display unit 350. The windows 402, 404, 406, 408, 410 may be moved on the display unit 350, minimized, or resized. In one embodiment, the areas of the display unit 350, i.e., the determined user focus area and a second area may correspond directly to and/or on a one to one basis with a window. Alternatively, the areas may include or be associated with one or more windows. In general, each portion or window 402, 404, 406, 408, 410 displays the market data (and allows the trader to formulate and submit a trader order) related to a single tradeable object. In the example of FIG. 4, five portions or windows are shown. However, the number of windows on the display unit 350 will vary based on how many tradeable objects the trader is viewing or monitoring. It should also be noted that one or more of the windows may be used for displaying information other than market data.

With particular reference to FIG. 3B, the trading device 110 also includes a portion control application or control application 366 associated with portion or window 402, 404, 406, 408, 410 shown in FIG. 4. The control application 366 for a particular window 402, 404, 406, 408, 410 is responsible for receiving information, e.g., market information for a particular tradeable object, and providing instructions to the display unit 350 to display the information in the associated window 402, 404, 406, 408, 410.

For example, in one exemplary embodiment, the trading device 110 receives market data related to a first tradeable object and market data related to a second tradeable object from the exchange 130. The market data related to the first tradeable object is delivered to a first instance of the portion control application or control application 366. The market data related to the second tradeable object is delivered to a second instance of the portion control application or control application 366. Each portion control application 366 receives the market data and displays the market data related to the associated tradeable object in the corresponding portion 402, 404, 406, 408, 410 on the display unit 350.

Since there may be multiple portions or windows open on the display unit 350, and each may be receive a constant stream or update of information, the processing overhead on the trading device 110 may be quite large. Since the trader can pay attention to only a number of tradeable objects at any one time, it may be unnecessary to continuously update the data in all of the portions or windows.

In one aspect of the present invention, the trading device 110 generates an attention value or metric based on the detected focus, or conversely the lack of attention, on the part of the user. In other words, the attention value describes the periods when the user or trader has lost focus on, or is not paying attention to, one (or more) of the first and second portions of the display unit. The attention value may be used to prevent updated market data related to a corresponding one of the first and second tradeable objects from being delivered to a one of the first and second control applications. In another embodiment, the attention value describes the periods when the user or trader is intently focused on a first portion of the display to the exclusion (or relative exclusion) of the second portion of the display unit and responsively increasing the available bandwidth or update priority allocated to updating market data related to the first portion of the screen. The additional bandwidth may be realized by decreasing the available bandwidth to update the market data presented on the second portion of the screen.

In one embodiment of the present invention, the attention value describing the user's focus on one or more of the portions or windows 402, 404, 406, 408, 410 is determined based on the output generated by the tracking mechanism 360. The tracking mechanism 360 may be used to determine on which portion of the display unit 350, and thus which portion or window 402, 404, 406, 408, 410, the user is focused, and/or to determine if the trader is in front of the trading device 110.

In another embodiment, the trading device 110 is configured to determine if the one of the first and second portion of the display unit is obscured and/or minimized when a lack of user attention or focus to one or both of those portions is detected. If one of the portions or windows is obscured, e.g., by another window, for a predetermined time period, then the trading device 110 determines that the user or trader is not paying attention to that window. Thus, the stream of data or market data to that window may be, at least temporarily, shut off. This will help reduce the processing overhead of the trading device 110, and may generally increase the performance of the trading device 110.

The streaming of data may be performed at different points, and to some extent, will be shut off at a location based on the architecture of the system in general. For instance, the stream of data may be (1) shut off at an network interface card 316 associated with the trading device 110 and/or (2) at a router 312 associated with the trading device 110 and/or (3) at a gateway 120 located between the exchange 130 and the trading device 110 and/or (4) at the trading device 110 and/or at the exchange 130.

Once the user or trader returns their attention to the window or portion for which the data stream has been turned off, the trading device 110 will enable the data stream so that the window is refreshed with updated market data.

In another aspect of the present invention, one or more trading devices 110 may be linked. If the data stream for a particular tradeable object is shut off at one of the trading devices 110, the data stream may be forwarded to a subsequent trading device 110.

Figure 5:
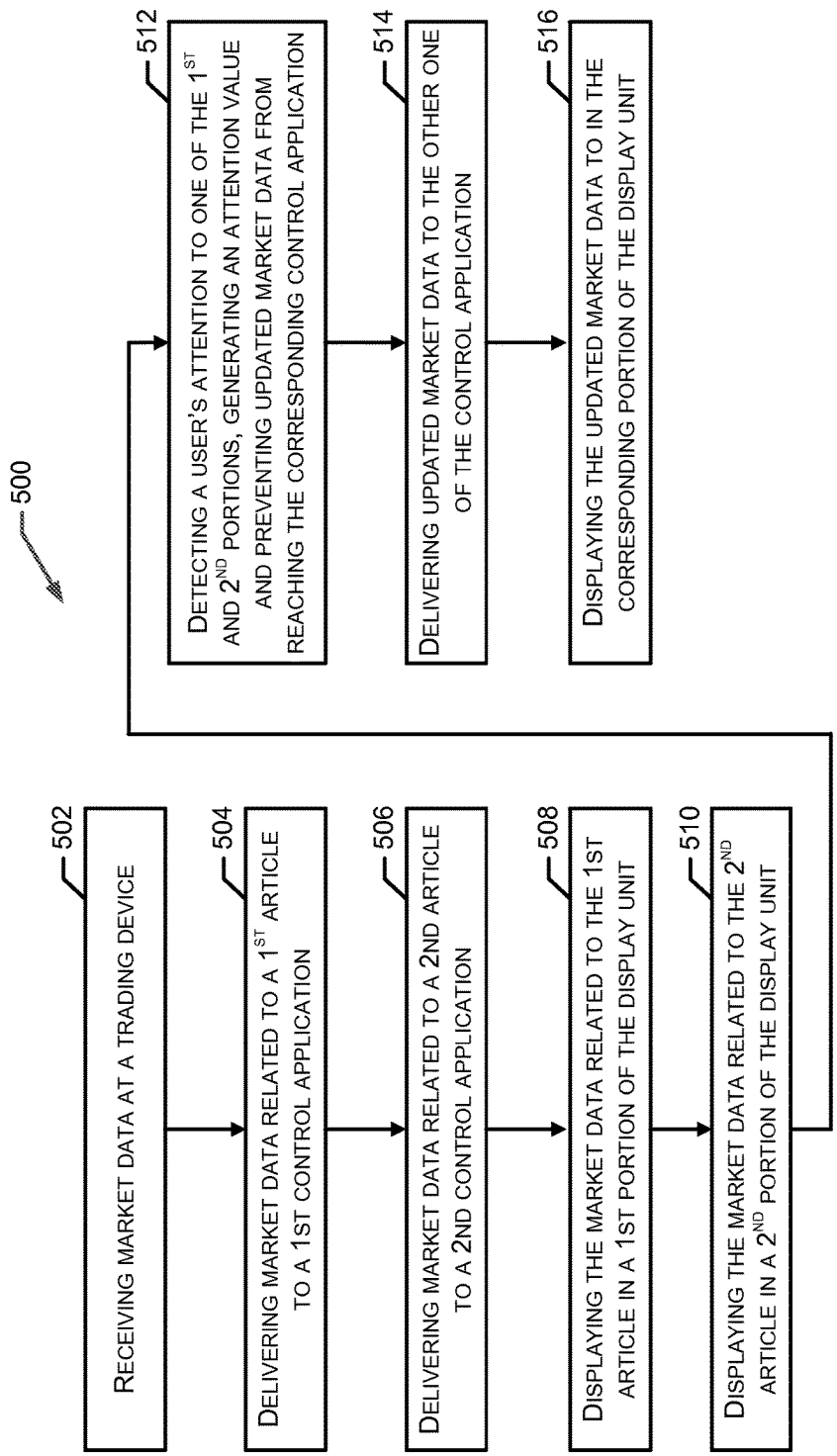
FIG. 5 is a flow diagram of a method according to an embodiment of the present invention.

With particular reference to FIG. 5, a method 500 of displaying information to a user is shown. In a first step 502, market data is received at a trading device 110, from an exchange 130. The market data includes market data related to a first tradeable object and a second tradeable object. In a second step 504, the market data related to the first tradeable object is delivered to a first control application 366 and in a third step 506, the market data related to the second tradeable object is delivered to a second control application 366. In a fourth step 508, the market data related to the first tradeable object is received by the first control application 366 and the market data related to the first tradeable object is responsively displayed in a first portion 402 of the display unit 350. In a fifth step 510, the market data related to the second tradeable object is received by the second control application 366 and the market data related to the second tradeable object is responsively displayed in a second portion 404 of the display unit 350.

An attention value representing the degree of attention on the part of the user on one of the first and second portions of the display unit 350 is detected and calculated, in a sixth step 512. The attention value can be utilized to control and/or manage the delivery of updated market data to one of the first and second control applications 366. Updated market data related to one of the first and second tradeable objects is delivered, in a seventh step 514, to a corresponding one of the first and second control applications 366 based on the calculated user attention value. In an eighth step 516, the updated market data related to one of the first and second tradeable objects is received by the corresponding first and second control applications 366. The updated market data related to one of the first and second tradeable objects is then displayed in one of the first and second portions 402, 404 of the display unit 350. For example, if the attention value corresponding to the first portion 402 of the display unit 350 is high, then market updates may be prioritized for faster delivery to the first portion 402 while market updates to the second portion 404 may be assigned a lower (less frequent) priority.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method of displaying information to a user, the method comprising:
    receiving, by a trading device, market data from at least one electronic exchange, wherein the market data relates to a first tradeable object and a second tradeable object being traded at the at least one electronic exchange;
    receiving the market data related to the first tradeable object by a first control application and responsively displaying the market data related to the first tradeable object in a first portion of a display unit of the trading device;
    receiving the market data related to the second tradeable object by a second control application and responsively displaying the market data related to the second tradeable object in a second portion of the display unit of the trading device;
    determining, by the trading device, that a user is in front of the display unit of the trading device;
    determining, by the trading device, gaze position data for a user with a sensor of a tracking mechanism of the trading device, wherein the gaze position data represents the user's gaze with respect to the display unit;
    determining, by the trading device, a user focus area with respect to the first portion of the display unit based on the gaze position data with a gaze control application of the trading device;
    in response to determining the user focus area with respect to the first portion of the display unit, sending a request from the trading device to an electronic exchange of the at least one electronic exchange at which the second tradeable object is traded to discontinue delivery of updated market data related to the second tradeable object to the second control application such that the second control application does not receive and does not display the updated market data related to the second tradeable object; and
    receiving updated market data related to the first tradeable object by the first control application and responsively displaying the updated market data related to the first tradeable object in the first portion of the display unit.

2. The method of claim 1 wherein the tracking mechanism includes at least one of a facial recognition system, an acoustic position system, a distance sensor, and an imaging sensor.

3. The method of claim 1, wherein the step of determining the gaze position data includes the step of determining if (1) the one of the first and second portion of the display unit is obscured and/or minimized and/or (2) no user is in front of the trading device.

4. The method of claim 1 including the steps of:
    detecting an increase in the user's focus on the second portion of the display unit;

sending a request from the trading device to the electronic exchange to provide delivery of updated market data related to the second tradeable object to the second control application; and receiving the updated market data related to the second tradeable object by the second control application and responsively displaying the updated market data related to the second tradeable object in the second portion of the display unit.

5. The method of claim 1 wherein the display unit includes a plurality of display devices, wherein the user's focus defines a user focus area on one of the first and second portions of the display unit.

6. A non-transitory computer readable medium having stored therein instructions executable by a processor, wherein the instructions are executable to:

receive, by a trading device, market data from at least one electronic exchange, wherein the market data relates to a first tradeable object and a second tradeable object being traded at the at least one electronic exchange;

receive the market data related to the first tradeable object by a first control application and responsively displaying the market data related to the first tradeable object in a first portion of a display unit of the trading device;

receive the market data related to the second tradeable object by a second control application and responsively displaying the market data related to the second tradeable object in a second portion of the display unit of the trading device;

determine, by the trading device, that a user is in front of the display unit of the trading device;

determine, by the trading device, gaze position data for a user with a sensor of a tracking mechanism of the trading device, wherein the gaze position data represents the user's gaze with respect to the display unit;

determine, by the trading device, a user focus area with respect to the first portion of the display unit based on the gaze position data with a gaze control application of the trading device;

in response to determining the user focus area with respect to the first portion of the display unit, send a request from the trading device to an electronic exchange of the at least one electronic exchange at which the second tradeable object is traded to discontinue delivery of updated market data related to the second tradeable object to the second control application such that the second control application does not receive and does not display the updated market data related to the second tradeable object; and receive updated market data related to the first tradeable object by the first control application and responsively displaying the updated market data related to the first tradeable object in the first portion of the display unit.

7. The computer readable medium of claim 6 wherein the tracking mechanism includes at least one of a facial recognition system, an acoustic position system, a distance sensor, and an imaging sensor.

8. The computer readable medium of claim 6, wherein the instructions to determine the gaze position data include instructions to determine if (1) the one of the first and second portion of the display unit is obscured and/or minimized and/or (2) no user is in front of the trading device.

9. The computer readable medium of claim 6, wherein the instructions are further executable to:

detect an increase in the user's focus on the second portion of the display unit;

send a request from the trading device to the electronic exchange to provide delivery of updated market data related to the second tradeable object to the second control application; and receive the updated market data related to the second tradeable object by the second control application and responsively displaying the updated market data related to the second tradeable object in the second portion of the display unit.

10. The computer readable medium of claim 6, wherein the display unit includes a plurality of display devices, wherein the user's focus defines a user focus area on one of the first and second portions of the display unit.

* * * * *